(12) United States Patent
Mao

(10) Patent No.: US 11,070,817 B2
(45) Date of Patent: Jul. 20, 2021

(54) VIDEO ENCODING METHOD, COMPUTER DEVICE, AND STORAGE MEDIUM FOR DETERMINING SKIP STATUS

(71) Applicant: TENCENT TECHNOLOGY (SHENZHEN) COMPANY LIMITED, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/890,882

(22) Filed: Jun. 2, 2020

(65) Prior Publication Data
US 2020/0296387 A1 Sep. 17, 2020

Related U.S. Application Data

(63) Continuation of application No. PCT/CN2018/112097, filed on Oct. 26, 2018.

(30) Foreign Application Priority Data

Feb. 1, 2018 (CN) .................... 201810102997.X

(51) Int. Cl.
*H04N 7/18* (2006.01)
*H04N 19/159* (2014.01)
(Continued)

(52) U.S. Cl.
CPC ......... *H04N 19/159* (2014.11); *H04N 19/105* (2014.11); *H04N 19/124* (2014.11)

(58) Field of Classification Search
CPC .. H04N 19/159; H04N 19/105; H04N 19/124; H04N 19/176; H04N 19/157;
(Continued)

(56) References Cited

U.S. PATENT DOCUMENTS

2014/0072041 A1* 3/2014 Seregin ................ H04N 19/176
375/240.13
2014/0092978 A1* 4/2014 Bugdayci ............... H04N 19/30
375/240.16
(Continued)

FOREIGN PATENT DOCUMENTS

CN 101572817 A 11/2009
CN 104104947 A 10/2014
(Continued)

OTHER PUBLICATIONS

Kim et al, Efficient intra-mode coding method in video coding (Year: 2012).*
(Continued)

*Primary Examiner* — Shan E Elahi
(74) *Attorney, Agent, or Firm* — Oblon, McClelland, Maier & Neustadt, L.L.P.

(57) ABSTRACT

A video encoding method is provided. A plurality of subunits is obtained by performing preset division on the current coding unit. A skip status of an intra-frame prediction mode corresponding to the current coding unit is determined according to differences between the plurality of subunits. In a case that the skip status of the intra-frame prediction mode corresponding to the current coding unit is determined to be skipped, execution of the intra-frame prediction mode for the current coding unit is skipped, and the current coding unit is encoded according to an inter-frame prediction mode.

20 Claims, 10 Drawing Sheets

(51) Int. Cl.
*H04N 19/105* (2014.01)
*H04N 19/124* (2014.01)

(58) Field of Classification Search
CPC ...... H04N 19/107; H04N 19/61; H04N 19/86; H04N 19/103; H04N 19/59
USPC .................................................. 375/240.12
See application file for complete search history.

(56) References Cited

U.S. PATENT DOCUMENTS

2015/0139296 A1* 5/2015 Yu .......................... H04N 19/70
375/240.02
2018/0063553 A1* 3/2018 Zhang ................. H04N 19/463

FOREIGN PATENT DOCUMENTS

| CN | 104853191 A | 8/2015 |
|---|---|---|
| KR | 10-1516347 B1 | 5/2015 |
| WO | WO2014161302 A1 | 10/2014 |

OTHER PUBLICATIONS

International Search Report Issued in Application PCT/CN2018/112097 dated Jan. 4, 2019, with English Machine Translation (5 pages).
Written Opinion Issued in Application PCT/CN2018/112097 dated Jan. 4, 2019 (3 pages).

* cited by examiner

VIDEO ENCODING METHOD, COMPUTER DEVICE, AND STORAGE MEDIUM FOR DETERMINING SKIP STATUS

RELATED APPLICATION

This application is a continuation of International Application No. PCT/CN2018/112097, filed on Oct. 26, 2018, which claims priority to Chinese Patent Application No. 201810102997.X, entitled "VIDEO ENCODING METHOD AND APPARATUS, COMPUTER-READABLE STORAGE MEDIUM, AND COMPUTER DEVICE" filed on Feb. 1, 2018. The entire disclosures of the prior applications are hereby incorporated by reference in their entirety.

FIELD OF THE TECHNOLOGY

This application relates to the field of computer technologies.

BACKGROUND OF THE DISCLOSURE

With development of computer technologies, video coding technologies appear. High Efficient Video Coding (HEVC) is a new-generation high efficient video coding standard jointly developed by the International Telecommunication Union-Telecommunication Standardization Sector (ITU-T) and the International Organization for Standardization (ISO). Compared with an original H. 264/Advanced video Coding (AVC) standard, the HEVC adopts more coding technologies that are newer and more flexible. With the same video quality, the HEVC can further reduce a code rate. However, the computational complexity of the HEVC is much higher than that of the H. 264/AVC, thus greatly increasing the difficulty of real-time communication.

Currently, during coding based on the HEVC, coding modes of coding units are selected mainly in the following manner: for all coding units in an intra-frame coding mode, an intra-frame prediction mode is selected; and for coding units in an inter-frame coding mode, an inter-frame prediction mode is selected first, and it is determined, according to a result of transform quantization coefficients of a selected optimal inter-frame prediction mode, whether to select an intra-frame prediction mode. The foregoing coding mode cannot flexibly implement intra-frame prediction selection, has high computational complexity, and has low video encoding efficiency.

SUMMARY

According to embodiments provided in this application, a video encoding method and apparatus, a non-transitory computer-readable storage medium, and a computer device are provided.

A video encoding method is provided. A plurality of subunits is obtained by performing preset division on the current coding unit. A skip status of an intra-frame prediction mode corresponding to the current coding unit is determined according to differences between the plurality of subunits. In a case that the skip status of the intra-frame prediction mode corresponding to the current coding unit is determined to be skipped, execution of the intra-frame prediction mode for the current coding unit is skipped, and the current coding unit is encoded according to an inter-frame prediction mode.

A video encoding apparatus including processing circuitry is provided. The processing circuitry is configured to obtain a plurality of subunits by performing preset division on a current coding unit. The processing circuitry is configured to determine a skip status of an intra-frame prediction mode corresponding to the current coding unit according to differences between the plurality of subunits. The processing circuity is configured to, in a case that the skip status of the intra-frame prediction mode corresponding to the current coding unit is determined to be skipped, skip execution of the intra-frame prediction mode for the current coding unit, and encode the current coding unit according to an inter-frame prediction mode.

A computer device includes a memory and a processor, the memory storing computer-readable instructions, and the computer-readable instructions, when executed by the processor, causing the processor to perform the video encoding method.

One or more non-volatile storage medium storing computer-readable instructions are provided, the computer-readable instructions, when executed by one or more processors, causing the one or more processors to perform the video encoding method. For example, a non-transitory computer-readable storage medium is provided. The non-transitory computer-readable storage medium stores instructions which when executed by a processor cause the processor to obtain a plurality of subunits by performing preset division on a current coding unit; determine a skip status of an intra-frame prediction mode corresponding to the current coding unit according to differences between the plurality of subunits; and in a case that the skip status of the intra-frame prediction mode corresponding to the current coding unit is determined to be skipped, skip execution of the intra-frame prediction mode for the current coding unit, and encode the current coding unit according to an inter-frame prediction mode.

Details of one or more embodiments of this application are provided in the following accompanying drawings and descriptions. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. The accompanying drawings in the following description show only some embodiments of this application, and a person of ordinary skill in the art may still derive other drawings from these accompanying drawings.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

Figure 1:
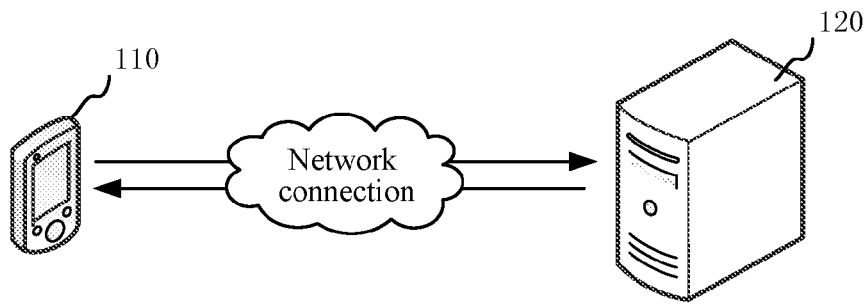
FIG. 1 is a diagram of an application environment of a video encoding method in an embodiment.

FIG. 1 is a diagram of an application environment of a video encoding method in an embodiment. The application environment includes a terminal 110 and a server 120. The terminal 110 encodes a video image. Specific encoding steps include: obtaining a subunit set corresponding to a current coding unit, the subunit set including subunits that are obtained by performing preset division on the current coding unit; determining, according to degrees of difference between subunits in the subunit set, a skip status of an intra-frame prediction mode corresponding to the current coding unit; and skipping execution of the intra-frame prediction mode for the current coding unit in a case that the skip status of the intra-frame prediction mode is yes, and encoding the current coding unit according to an inter-frame prediction mode. The terminal 110 may transmit an encoded video to the server 120 through a network. Alternatively, the terminal 110 may transmit an obtained video image to the server 120, and the video image is encoded according to the foregoing method in the server 120.

The server 120 may be an single server, or may be a server cluster including a plurality of physical servers, or may be a cloud server providing basic cloud computing services, such as a cloud server, a cloud database, cloud storage and a content delivery network (CDN). The terminal 110 may be a smartphone, a tablet computer, a notebook computer, a desktop computer, a professional camera, or the like, but is not limited thereto. The server 120 and the terminal 110 may be connected in a communication connection manner such as a network, which is not limited in the present disclosure.

Figure 2:
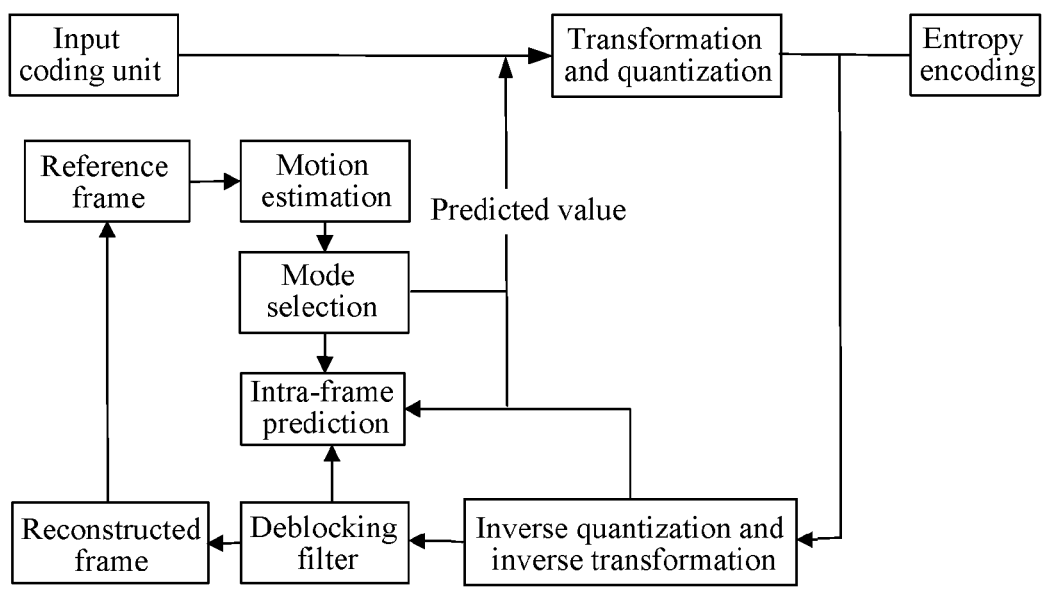
FIG. 2 is a framework diagram of a video encoding method in an embodiment.

FIG. 2 is a framework diagram of a video encoding method in an embodiment. Referring to FIG. 2, during video encoding, a video image is divided into a plurality of coding units. A coding control module selects, according to local features of different coding units in a video frame, a coding prediction mode adopted by the coding unit. The prediction mode may include intra-frame prediction coding or inter-frame prediction coding. Spatial prediction is performed on a coding unit that adopts intra-frame prediction coding. The spatial prediction refers to a coding algorithm for performing prediction in a spatial domain. Spatial redundancy between adjacent blocks may be removed. Motion estimation is performed on a coding unit that adopts inter-frame prediction coding, and then motion compensation prediction is performed, to obtain a predicted value. An actual value of the coding unit is subtracted from the predicted value to obtain a prediction residual. Then, a residual coefficient is formed through transformation and quantization processing, and finally, a final code stream is generated by using an entropy encoder. During inter-frame prediction, motion estimation needs to be performed with reference to other coded units that have been predictively coded. Therefore, the motion estimation needs to be performed on the encoded coding units after inverse quantization and inverse transformation, a deblocking filter and a reference frame. Because there are various prediction modes of the coding units, and the computing process is complex, if calculation is performed in each prediction mode, the encoding efficiency is reduced. Therefore, some of the coding units can skip the intra-frame prediction coding according to some features of the coding units, thereby reducing a calculation amount, and improving the encoding efficiency.

Figure 3:
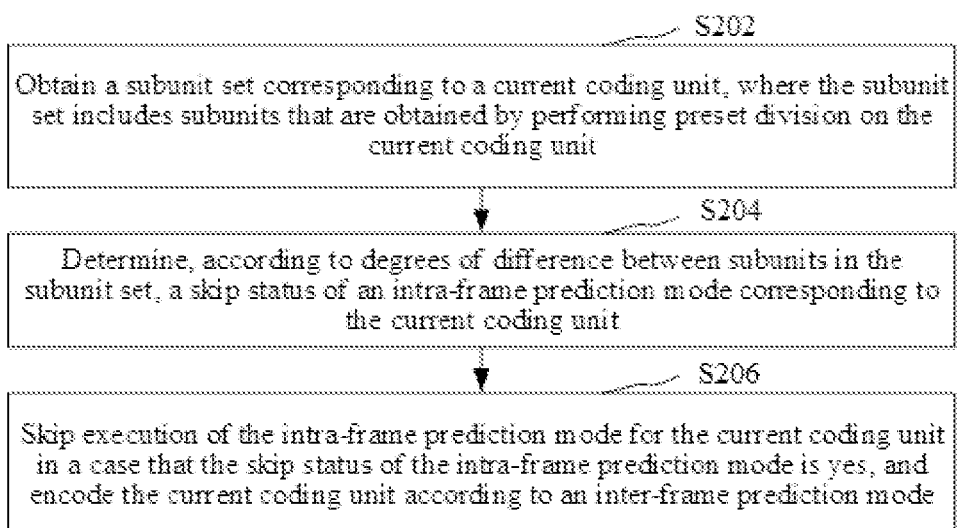
FIG. 3 is a schematic flowchart of a video encoding method in an embodiment.

As shown in FIG. 3, in an embodiment, a video encoding method is provided. For example, the video encoding method is applied to the terminal or the server shown in FIG. 1, and the video encoding method specifically includes the following steps.

In step S202, a subunit set corresponding to a current coding unit is obtained, the subunit set including subunits that are obtained by performing preset division on the current coding unit.

Figure 4:
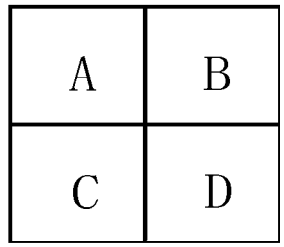
FIG. 4 is a schematic diagram of preset division of a current coding unit in an embodiment.

In an embodiment, the current coding unit (CU) is one of a plurality of coding blocks obtained after coding division of an image. For example, a tree-like CU structure is adopted in HEVC. Four types of coding units: 64×64, 32×32, 16×16 and 8×8, can be flexibly selected. The preset division is not equivalent to the coding division. The coding division is division according to a coding standard, while the preset division is not limited by the coding standard and is only used for dividing an image into a plurality of areas, where the areas may or may not overlap with each other. The current coding unit is divided into a plurality of subunits according to a preset rule. The subunits may or may not overlap with each other. Sizes of the subunits may or may not be the same. For example, in the HEVC, the current coding unit is divided into four subunits of a same size, and a set formed by the four subunits is referred to as a subunit set. As shown in FIG. 4, the current coding unit has a size of 64×64 pixels. The current coding unit is divided into a subunit set including four non-overlapping 32×32 subunits or four partially overlapping 32×32 subunits.

In step S204, a skip status of an intra-frame prediction mode corresponding to the current coding unit is determined according to degrees of difference between subunits in the subunit set.

A difference degree is determined according to image content of subunits. A higher degree of difference between subunits indicates that the subunits are less similar. On the contrary, a lower degree of difference between subunits indicates that the subunits are more similar. The skip status of the intra-frame prediction mode corresponding to the current coding unit is used for indicating whether the current coding unit skips the intra-frame prediction mode, where the skip status includes a yes status and a no status. In a case that the skip status is yes, it indicates that when the current coding unit is encoded, the intra-frame prediction mode is skipped, and an inter-frame prediction mode is selected. In a case that the skip status is no, it indicates that when the current coding unit is encoded, the intra-frame prediction mode needs to be executed. Whether the current coding unit skips the intra-frame prediction mode is determined according to the degrees of difference between the subunits corresponding to the current coding unit.

In an embodiment, in a case that the skip status of the intra-frame prediction mode corresponding to the current coding unit is determined to be no according to the degrees of difference between subunits in the subunit set, a prediction mode of the current coding unit may be further determined according to other conditions.

In an embodiment, the difference degree is determined according to a pixel difference between the subunits. Pixels of the image are used for describing the image content. The skip status of the intra-frame prediction mode corresponding to the current coding unit is determined according to a difference between pixels, and this is equivalent to determining the skip status of the intra-frame prediction mode corresponding to the current coding unit according to the difference between content of the image itself. The similarity between the subunits may be determined more accurately according to the difference between the content of the image itself, so that the skip status determined according to the similarity is more accurate.

In another embodiment, the degree of difference is obtained by performing transformation processing according to the pixel difference between the subunits. A specific algorithm of the transformation processing may be customized, for example, Fourier transform, and quantization after transform. For example, the pixel difference between the subunits is transformed or quantized to obtain the difference degree. Different spatial information may be obtained by transforming the pixel difference, for example, transforming from a time domain space to a frequency domain space. The similarity between the subunits may be reflected more accurately by adopting multi-dimensional information.

In step S206, execution of the intra-frame prediction mode for the current coding unit is skipped in a case that the skip status of the intra-frame prediction mode is yes, and the current coding unit is encoded according to an inter-frame prediction mode.

In an embodiment, in a case that the skip status of the intra-frame prediction mode of the current coding unit is determined to be yes according to the degrees of difference between the subunits, it indicates that the inter-frame prediction mode is more applicable to the current coding unit. The intra-frame prediction mode is skipped when the current coding unit is encoded, and the step of calculating an inter-frame coding cost in the inter-frame prediction mode is directly performed, so as to determine a target coding mode according to the inter-frame coding cost, and encode the current coding unit according to the target coding mode.

Further, if the coding division may further be performed on the current coding unit, the current coding unit is divided to obtain sub coding units. The sub coding units obtained after the division form a sub coding unit set, and each sub coding unit in the sub coding unit set is encoded as the current coding unit by using the foregoing encoding method.

In the foregoing video encoding method, a subunit set corresponding to a current coding unit is obtained, the subunit set including subunits that are obtained by performing preset division on the current coding unit; a skip status of an intra-frame prediction mode corresponding to the current coding unit is determined according to degrees of difference between subunits in the subunit set; and execution of the intra-frame prediction mode is skipped for the current coding unit in a case that the skip status of the intra-frame prediction mode is yes, and the current coding unit is encoded according to an inter-frame prediction mode. The skip status of the intra-frame prediction mode corresponding to the current coding unit is determined by calculating the degrees of difference between the subunits corresponding to the current coding unit, so as to reduce selections of the intra-frame prediction mode in the encoding process, thereby reducing the video encoding complexity, and improving the video encoding efficiency. The skip status of the intra-frame prediction mode corresponding to the current coding unit is determined according to the degrees of difference between the subunits. The degrees of difference between the subunits reflect degrees of difference between image content. The intra-frame prediction mode corresponding to the current coding unit is determined according to the degrees of difference between the image content, which can reduce encoding loss and ensure encoding quality.

Figure 5:
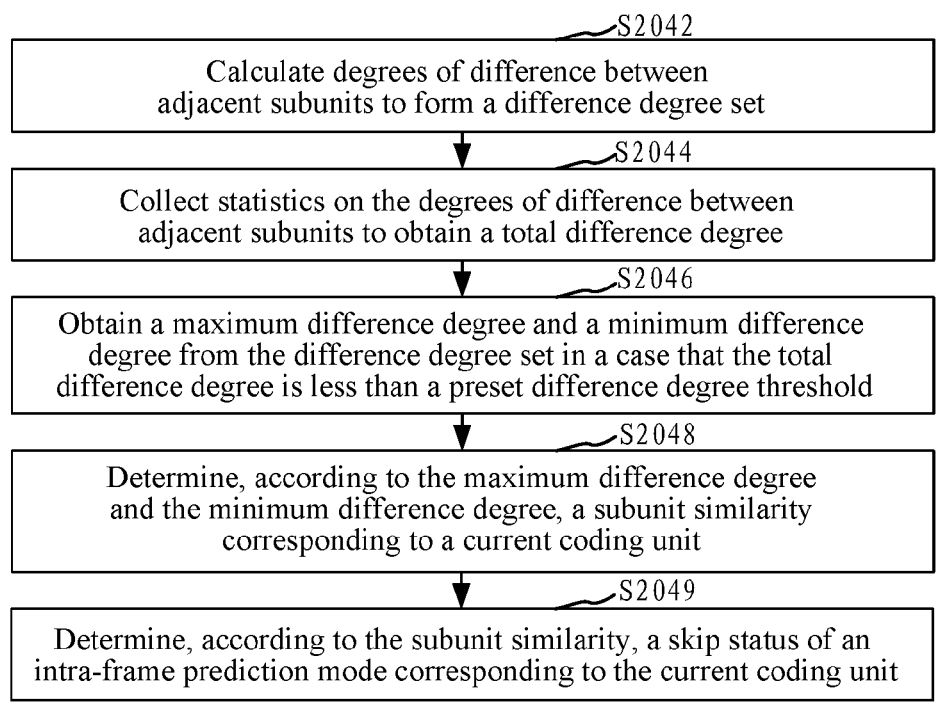
FIG. 5 is a schematic flowchart of a step of determining a skip status according to a degree of difference between adjacent subunits in an embodiment.

As shown in FIG. 5, in an embodiment, step S204 includes the following steps.

In step S2042, degrees of difference between adjacent subunits are calculated to form a difference degree set.

In an embodiment, the degree of difference between adjacent subunits is used for indicating a degree of difference or similarity between the adjacent subunits. A higher degree of difference between adjacent subunits indicates that the adjacent subunits are less similar. On the contrary, a lower degree of difference indicates that the adjacent subunits are more similar. The degrees of difference between adjacent subunits in the subunit set are calculated, and the degrees of difference between the adjacent subunits form a difference degree set.

In an embodiment, the degrees of difference between adjacent subunits include, but are not limited to, being measured by a sum of absolute errors, a sum of differences of Hadamard transform, a sum of transformed absolute errors, or a mean absolute difference parameter.

In step S2044, statistics on the degrees of difference between adjacent subunits are collected to obtain a total difference degree.

In an embodiment, statistics on the difference degrees are collected, for example, the difference degrees are summed, to obtain a total difference degree. The total difference degree is used for determining a total similarity of four subunits. A higher difference degree indicates that the subunits are less similar. On the contrary, a lower difference degree indicates that the subunits are more similar.

In step S2046, a maximum difference degree and a minimum difference degree from the difference degree set are obtained in a case that the total difference degree is less than a preset difference degree threshold.

In an embodiment, the preset difference degree threshold is a critical value for determining whether images are similar. In a case that the total difference degree is less than the preset difference degree threshold, it indicates that the subunits are similar, and the maximum difference degree and the minimum difference degree are selected from the difference degree set of the subunits. The maximum difference degree indicates that two adjacent subunits are the least similar. The minimum difference degree indicates that two adjacent subunits are the most similar.

In an embodiment, the preset difference degree threshold is set according to experience.

In another embodiment, the preset difference degree threshold is determined according to a mode of an encoded coding unit, a difference degree, and/or a difference degree threshold of the encoded coding unit.

In still another embodiment, the preset difference degree threshold is a value in a positive correlation with a size of the current coding unit.

In step S2048, a subunit similarity corresponding to the current coding unit is determined according to the maximum difference degree and the minimum difference degree.

Specifically, the maximum difference degree represents a difference degree corresponding to two subunits with the largest difference in the subunit set. The minimum difference degree represents a difference degree corresponding to two subunits with the smallest difference in the subunit set. The subunit similarity corresponding to the current coding unit is determined by comparing a difference between the maximum difference degree and the minimum difference degree. The difference between the maximum difference degree and the minimum difference degree may be determined by a user-defined algorithm. For example, the difference may be determined according to a ratio and/or a difference value between the maximum difference degree and the minimum difference degree.

In step S2049, the skip status of the intra-frame prediction mode corresponding to the current coding unit is determined according to the subunit similarity.

In an embodiment, the skip status of the intra-frame prediction mode corresponding to the current coding unit is determined according to the subunit similarity. When the subunit similarity satisfies a preset similarity threshold, the skip status of the intra-frame prediction mode corresponding to the current coding unit is set to be no. Otherwise, the skip status of the intra-frame prediction mode corresponding to the current coding unit is set to be yes. The similarity between adjacent subunits is determined by calculating the degree of difference between the adjacent subunits, and the skip status of the intra-frame prediction mode corresponding to the current coding unit is determined according to the similarity between every two adjacent subunits, thereby the number of selections of the intra-frame prediction mode corresponding to the current coding unit, and improving the encoding efficiency.

In an embodiment, referring to FIG. 4, the subunits divided from the current coding unit include a subunit A, a subunit B, a subunit C, and a subunit D. The subunit A is adjacent to the subunit B and the subunit C. The subunit D is adjacent to the subunit B and the subunit C. Degrees of difference between the subunit A and the subunits B and C and between the subunit D and the subunits B and C are calculated, and the obtained difference degrees are represented by AB, AC, BD and CD respectively. The four difference degrees form a difference degree set. A corresponding total difference degree Sum_ABCD is obtained by collecting statistics on the four difference degrees AB, AC, BD and CD. When the total difference degree Sum_ABCD is less than a preset difference degree threshold T_ABCD, a maximum difference degree and a minimum difference degree are found from the difference degrees AB, AC, BD and CD. It is assumed that the maximum difference degree is AB, the minimum difference degree is CD. A similarity of the subunits A, B, C and D is determined through a difference between AB and CD. The skip status of the intra-frame prediction mode corresponding to the current coding unit is determined according to the similarity of the subunits A, B, C and D.

Figure 6:
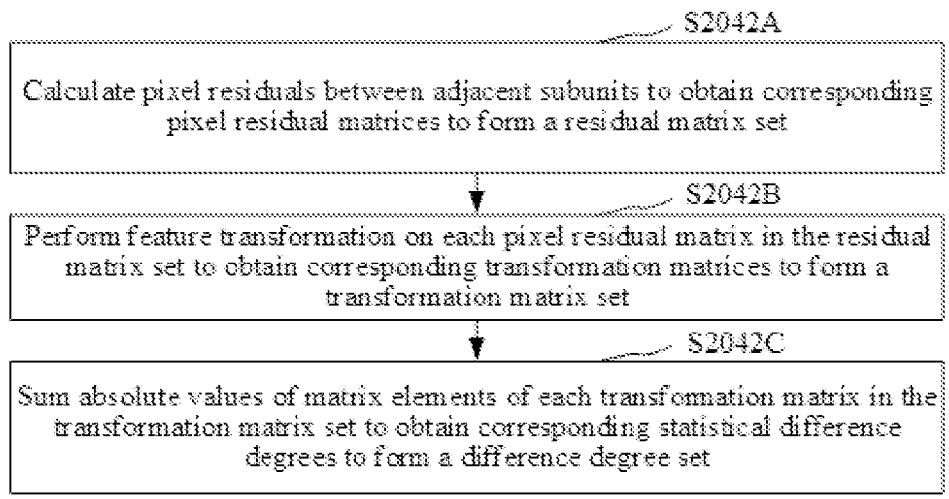
FIG. 6 is a schematic flowchart of a step of calculating a degree of difference between adjacent subunits in an embodiment.

As shown in FIG. 6, in an embodiment, step S2042 includes the following steps.

In step S2042A, pixel residuals between the adjacent subunits are calculated to obtain corresponding pixel residual matrices to form a residual matrix set.

In an embodiment, a pixel residual matrix is used for representing a difference between two matrices. The pixel residual matrix is obtained by calculating a pixel residual between pixels of adjacent subunits, and a set including pixel residual matrices of adjacent subunits is the residual matrix set.

In step S2042B, feature transformation is performed on each pixel residual matrix in the residual matrix set to obtain corresponding transformation matrices to form a transformation matrix set.

In an embodiment, the feature transformation is used for projecting data from one space to another space. Data presents different data features in different spaces. Each pixel residual matrix in the residual matrix set is transformed through feature transformation to obtain a corresponding transformation matrix. The transformation matrices form the transformation matrix set.

In an embodiment, the feature transformation may be Hadamard transformation. In the Hadamard transformation, a Hadamard matrix is used as a transformation matrix to transform a matrix. The pixel residual matrices are transformed to obtain transformation matrices. A set including the transformation matrices is the transformation matrix set. The Hadamard matrix is a symmetric orthogonal matrix. A 2-order Hadamard transformation matrix is $H_2$. A specific expression is shown in the formula (1):

$$H_2 = \begin{bmatrix} 1 & 1 \\ 1 & -1 \end{bmatrix} \quad (1)$$

A 2N-order Hadamard matrix $H_{2N}$ is represented by an N-order Hadamard transformation matrix $H_N$, as shown in the formula (2):

$$H_{2N} = \begin{bmatrix} H_N & H_N \\ H_N & -H_N \end{bmatrix} \quad (2)$$

In an embodiment, a transformation matrix is obtained by performing the Hadamard transformation on a pixel residual matrix AB. That is, $T_{AB}=H \cdot AB$, where H is a Hadamard transformation matrix.

In step S2042C, absolute values of matrix elements of each transformation matrix in the transformation matrix set are summed to obtain corresponding statistical difference degrees to form the difference degree set.

Specifically, the absolute values of the matrix elements in the transformation matrix are calculated. Statistics on the absolute values of the matrix elements in the matrix are collected to obtain the corresponding statistical difference degrees. The statistical difference degrees of the transformation matrices form the difference degree set.

In an embodiment, the Hadamard transformation may be performed on the pixel residual matrix. The difference degree obtained after calculation of the transformed absolute values is more accurate than a directly calculated pixel sum of a pixel residual matrix of two subunits, so that the similarity or the degree of difference between the two adjacent subunits can be better reflected.

In an embodiment, it is assumed that the transformation matrix after the pixel residual transformation is as shown in formula (3):

$$T_{AB} = \begin{bmatrix} 1 & 3 \\ 2 & -1 \end{bmatrix} \quad (3)$$

A degree of difference between adjacent subunits A and B is $HAD_1 = 1+2+3+1=7$.

In an embodiment, after step S2044, the method includes: skip status of the intra-frame prediction mode corresponding to the current coding unit is determined to be yes in a case that the total difference degree is greater than the preset difference degree threshold.

Specifically, the total difference degree is compared with the preset difference degree threshold that is set according to experience or the preset difference degree threshold determined according to the encoded coding unit. In a case that the total difference degree is greater than the preset difference degree threshold, it indicates that the subunits corresponding to the current coding unit is greatly different. The skip status of the inter-frame prediction mode corresponding to the current coding unit is set to be yes, indicating that the inter-frame prediction mode is more appropriate during encoding of the current coding unit. The difference degree of the current coding unit is determined through the total difference degree, because the integrity of the coding unit can be better reflected by considering the similarity of the subunits as a whole.

In an embodiment, in a case that the total difference degree is less than or equal to the preset difference degree threshold, degrees of difference between some subunits are selected from the degrees of difference between the subunits in a customized manner. The degrees of difference between some subunits are calculated by using a user-defined algorithm, and the skip status of the intra-frame prediction mode corresponding to the current coding unit is determined according to a result obtained through calculation.

In an embodiment, a largest difference degree and a smallest difference degree are selected from the degrees of difference between the subunits as the maximum difference degree and the minimum difference degree respectively. The maximum difference degree and the minimum difference degree are calculated according to the user-defined algorithm to obtain a corresponding calculation result.

In an embodiment, step S2048 includes: calculating a ratio of the maximum difference degree to the minimum difference degree.

In an embodiment, after the maximum difference degree and the minimum difference degree are obtained, the ratio of the maximum difference degree to the minimum difference degree is calculated. A difference between the maximum value and the minimum value is reflected by calculating the ratio of the maximum difference degree to the minimum difference degree. The difference between the maximum difference degree and the minimum difference degree may reflect a largest difference between subunits.

In an embodiment, step S2049 includes: the skip status of the intra-frame prediction mode corresponding to the current coding unit is determined to be no in a case that the ratio is less than a preset threshold.

In an embodiment, if the ratio is less than the preset threshold, indicating that the difference degree is small, that is, the subunit similarity of the current coding unit is relatively good, the skip status of the intra-frame prediction mode corresponding to the current coding unit is set to be no. The intra-frame prediction mode is suitable for the current coding unit. The preset threshold may be set according to experience, or may be obtained through calculation according to a mode of the encoded coding unit and a Hadamard difference sum of the encoded coding unit. For example, the preset threshold is determined according to the Hadamard difference sum or an average value of the encoded coding unit that uses the intra-frame prediction.

On the basis of the total difference degree, an overall difference and a local difference can be comprehensively considered by referring to the ratio of the maximum difference degree to the minimum difference degree, so that the skip status of the intra-frame prediction mode corresponding to the current coding unit may be determined more accurately.

In an embodiment, after the calculating a ratio of the maximum difference degree to the minimum difference degree, the method includes: the skip status of the intra-frame prediction mode corresponding to the current coding unit is determined to be yes in a case that the ratio is greater than the preset threshold and coding division is allowed to be performed on the current coding unit.

In an embodiment, the coding division refers to dividing an image or a coding unit according to a coding standard. Different coding standards correspond to different coding division modes. Whether the coding division can be performed on the current coding unit is determined according to whether the current coding unit is a minimum coding unit. If the current coding unit is a minimum coding unit, it indicates that the coding division cannot be performed on the current coding unit. If the current coding unit is not a minimum coding unit, it indicates that the coding division can be performed on the current coding unit. When it is determined that the ratio of the maximum difference degree to the minimum value difference degree is greater than the preset threshold, it indicates that the similarity of the subunits of the current coding unit is relatively low. The skip status of the intra-frame prediction mode corresponding to the current coding unit is determined according to a coding division condition of the current coding unit. If the coding division can be performed on the coding of the current coding unit, the skip status of the intra-frame prediction mode corresponding to the current coding unit is set to be yes, and the current coding unit skips the intra-frame prediction mode, thereby reducing selections of the intra-frame prediction mode, and improving the video encoding efficiency.

In an embodiment, after the calculating a ratio of the maximum difference degree to the minimum difference degree, the method includes: the skip status of the intra-frame prediction mode corresponding to the current coding unit is determined to be no in a case that the ratio is greater than the preset threshold and the coding division is not allowed to be performed on the current coding unit.

In an embodiment, when it is determined that the ratio of the maximum difference degree to the minimum value difference degree is greater than the preset threshold, it indicates that the similarity of the subunits of the current coding unit is relatively low. The skip status of the intra-frame prediction mode corresponding to the current coding unit is determined according to the coding division condition of the current coding unit. If coding of the current coding unit cannot be divided in a next step, the skip status of the intra-frame prediction mode corresponding to the current coding unit is set to be no, which indicates that the intra-frame prediction mode is suitable for the current coding unit.

In this embodiment, the skip status of the intra-frame prediction mode corresponding to the current coding unit is determined according to a coding division status of the current coding unit, and selections of the intra-frame prediction mode are reduced through the coding division of the current coding unit, thereby improving the video encoding efficiency.

Figure 7:
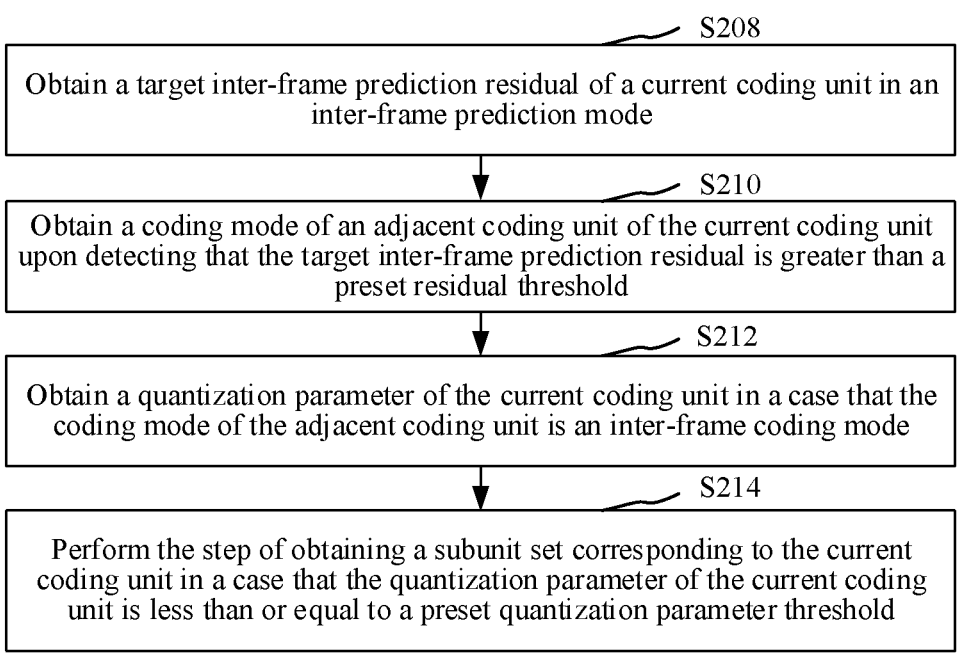
FIG. 7 is a schematic flowchart of a video encoding method in another embodiment.

As shown in FIG. 7, in an embodiment, before step S202, the method includes the following steps.

In step S208, a target inter-frame prediction residual of the current coding unit in the inter-frame prediction mode is obtained.

In an embodiment, the inter-frame prediction is performed on the current coding unit to obtain one or more coding modes in the inter-frame prediction mode, and a prediction residual corresponding to an optimal coding mode is selected as a target inter-frame prediction residual. The optimal coding mode may be determined according to an inter-frame prediction residual, or may be determined according to an inter-frame prediction coding cost. For example, a minimum inter-frame prediction residual is selected as the target inter-frame prediction residual.

In step S210, a coding mode of an adjacent coding unit of the current coding unit is obtained upon detecting that the target inter-frame prediction residual is greater than a preset residual threshold.

In an embodiment, the preset residual threshold may be set according to experience, or may be determined according to the residual of an encoded unit. For example, the residual is determined according to an adjacent encoded unit. In a case that the target prediction residual obtained in step S208 is greater than the preset residual, it indicates that the inter-frame prediction mode is not necessarily the optimal prediction mode. Whether the intra-frame prediction mode is selected cannot be determined according to the target prediction residual of the current coding unit. A coding mode of the adjacent coding unit of the current coding unit may be further obtained. Whether the intra-frame prediction mode is selected is further determined according to the coding mode of the adjacent coding unit.

In step S212, a quantization parameter of the current coding unit is obtained in a case that the coding mode of the adjacent coding unit is an inter-frame coding mode.

In an embodiment, if the coding mode of the adjacent coding unit of the current coding unit does not include the intra-frame coding mode, it indicates that whether to select the intra-frame prediction mode cannot be determined according to the coding mode of the adjacent unit only. The quantization parameter of the current coding unit is further obtained. The quantization parameter reflects a compression status of spatial details. A small quantization parameter means that most of the details may be reserved. As the quantization parameter increases, some of the details of the picture are lost, a code rate decreases, image distortion is strengthened, and the quality declines. The quantization parameter may measure encoding quality. Therefore, the skip status of the current coding unit is determined according to the quantization parameter, so that the video encoding quality can be effectively guaranteed.

In step S214, the step of obtaining the subunit set corresponding to the current coding unit in a case that the quantization parameter of the current coding unit is less than or equal to a preset quantization parameter threshold is performed.

In an embodiment, if the quantization parameter of the current coding unit is less than or equal to the preset quantization parameter threshold, it indicates that more details of the picture are reserved. Step S202 is performed to obtain the subunit set corresponding to the current coding unit.

In this embodiment, the skip status of the intra-frame prediction mode corresponding to the current coding unit may be determined more accurately according to the coding mode of the adjacent coding unit of the current coding unit and/or the quantization parameter of the current coding unit, thereby improving the encoding efficiency, and reducing the encoding loss.

In an embodiment, after step S210, the method further includes: the skip status of the intra-frame prediction mode corresponding to the current coding unit is determined to be no in a case that the coding mode of the adjacent coding unit is an intra-frame coding mode.

In an embodiment, when the adjacent coding unit has the intra-frame coding mode, the skip status of the intra-frame prediction mode corresponding to the current coding unit is set to be no. The intra-frame prediction mode is suitable for the current coding unit. When the adjacent coding unit has the intra-frame coding mode, it indicates that image content of the adjacent coding unit is relatively similar, and it is highly probable that image content of the coding unit close to the adjacent coding unit is similar. Therefore, the intra-frame prediction mode can be selected.

In an embodiment, after step S214, the method includes: the skip status of the intra-frame prediction mode corresponding to the current coding unit is determined to be no in a case that the quantization parameter of the current coding unit is greater than the preset quantization parameter threshold.

In an embodiment, the quantization parameter represents a coding step length of the coding, and a longer step represents that more details of an image are lost. In a case that the quantization parameter of the current coding unit is greater than the preset quantization parameter threshold, which represents that the current coding unit has a relatively long coding step, it indicates that the coding has a relatively high degree of distortion, and the intra-frame prediction mode needs to be selected. The skip status of the intra-frame prediction mode corresponding to the current coding unit is set to be no.

In this embodiment, the skip status of the intra-frame prediction mode corresponding to the current coding unit is determined according to a value of the quantization parameter of the current coding unit. The quantization parameter reflects the video encoding quality. The optimal coding mode ensures certain encoding quality while the image is compressed to a minimum size. The skip status of the intra-frame prediction mode corresponding to the current coding unit determined according to the quantization parameter is more accurate, and the video encoding quality can be guaranteed to a certain extent.

Figure 8:
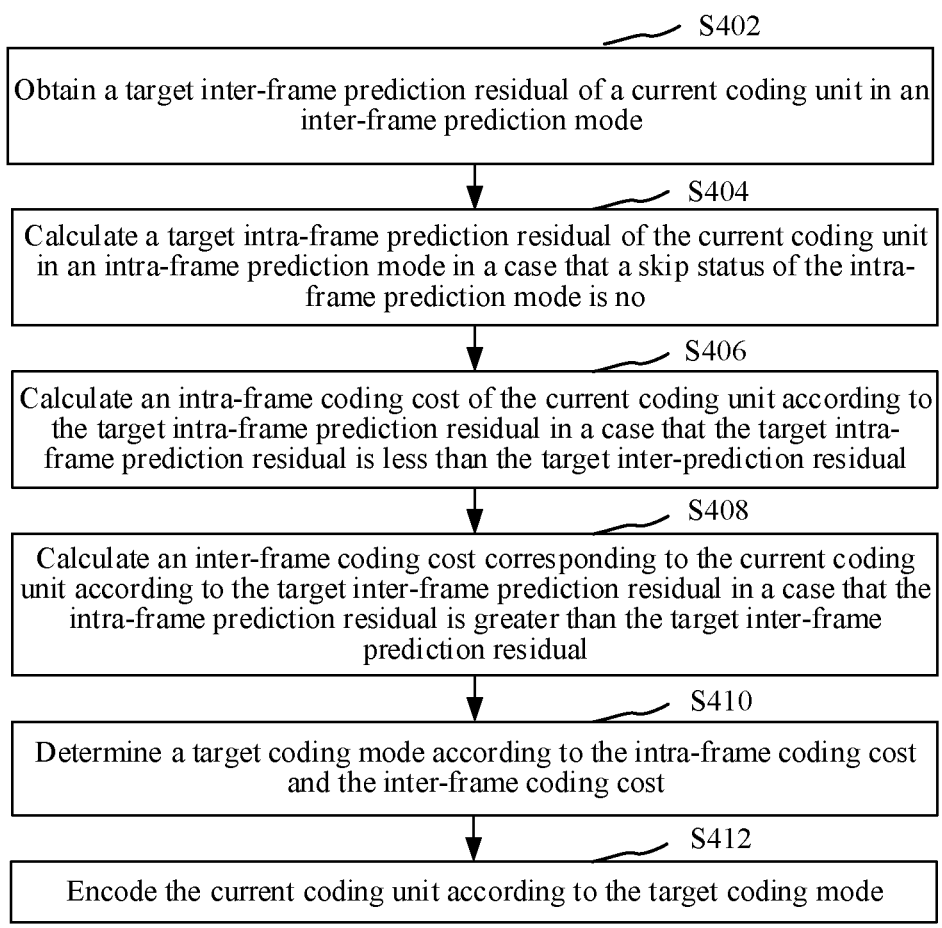
FIG. 8 is a schematic flowchart of a step of encoding in an intra-frame prediction mode in an embodiment.

As shown in FIG. 8, in an embodiment, the video encoding method further includes the following steps.

In step S402, a target inter-frame prediction residual of the current coding unit in the inter-frame prediction mode is obtained.

In video coding, redundant information of an image includes temporal redundant information, and the inter-frame prediction can reduce the temporal redundant information. When a video image is inputted to an encoder, the video image may be divided into one or more coding units, and then a target prediction mode corresponding to the coding unit may be selected. The prediction mode may be set according to different video coding standards.

In an embodiment, coding division is performed on a video image to obtain coding units. One of the coding units is selected as a current coding unit. Inter-frame prediction is performed on the current coding unit to obtain one or more coding modes in the inter-frame prediction mode, and a prediction residual corresponding to an optimal coding mode is selected as a target inter-prediction residual.

In step S404, a target intra-frame prediction residual of the current coding unit in the intra-frame prediction mode is calculated in a case that the skip status of the intra-frame prediction mode is no.

The target intra-frame prediction residual is a minimum coding cost among coding costs corresponding to the intra-frame coding modes of the current coding unit in the intra-prediction mode. The coding cost of the current coding unit may be obtained by calculating the quantization parameter and/or the corresponding residual of the current coding unit. During encoding of the current coding unit, the intra-frame prediction mode is skipped. The target intra-frame prediction residual of the current coding unit in the intra-frame prediction mode is calculated.

In an embodiment, because coding costs corresponding to multiple coding modes need to be calculated, relatively coarse coding costs may be calculated by using a coding cost calculation method with relatively low complexity. A minimum coding cost is selected from the coarse coding costs as the intra-frame coding mode of the current coding unit, and an intra-frame prediction residual corresponding to the intra-frame coding mode is used as the target intra-frame prediction residual.

In step S406, an intra-frame coding cost of the current coding unit is calculated according to the target intra-frame prediction residual in a case that the target intra-frame prediction residual is less than the target inter-prediction residual.

In an embodiment, the target intra-frame prediction residual is compared with the target inter-frame prediction residual. In a case that the target intra-frame prediction residual is less than the target inter-prediction residual, it indicates that the intra-frame prediction residual is smaller. That is, it is better to select the intra-frame prediction mode for coding in a current layer. Therefore, the intra-frame coding cost of the current coding unit is calculated according to the target intra-frame prediction residual.

In an embodiment, a more accurate intra-frame coding cost may be obtained by using an algorithm with higher encoding complexity.

In step S408, an inter-frame coding cost corresponding to the current coding unit is calculated according to the target inter-frame prediction residual in a case that the intra-frame prediction residual is greater than the target inter-frame prediction residual.

In an embodiment, in a case that the target intra-frame prediction residual is greater than the target inter-frame prediction residual, it indicates that the intra-frame prediction residual is smaller. The inter-frame coding cost of the current coding unit is calculated according to the target intra-frame prediction residual.

In an embodiment, because only the coding cost of the coding mode corresponding to the target inter-frame prediction residual is calculated, a more accurate inter-frame coding cost can be obtained by using an algorithm with higher encoding complexity.

In step S410, a target coding mode is determined according to the intra-frame coding cost and the inter-frame coding cost.

In an embodiment, the target coding mode is determined according to the intra-frame coding cost and/or the inter-frame coding cost. The target coding mode is determined according to a minimum coding cost of the intra-frame coding cost and the inter-frame coding cost.

In step S412, the current coding unit is encoded according to the target coding mode.

In an embodiment, after the target coding mode is determined, the current coding unit is encoded according to the corresponding coding mode.

In an embodiment, the HEVC is used as an example. If the coding cost is COST, COST=D+$\lambda$R, where D indicates a distortion degree of an image coding block corresponding to the current coding unit, D may be obtained through calculation by using an absolute difference and an SAD operation, $\lambda$ is a Lagrange constant, and R indicates a quantity of bits occupied by the image coding block corresponding to the coding unit. The intra-frame coding cost and the inter-frame coding cost are calculated according to the coding cost calculation method. The target coding mode is determined according to the intra-frame coding cost and the inter-frame coding cost. The best coding is to compress the video to a minimum size while a certain degree of distortion is allowed. Therefore, the coding cost determined according to a distortion rate and the quantity of bits can achieve a balance between a compression rate and the distortion rate.

Figure 9:
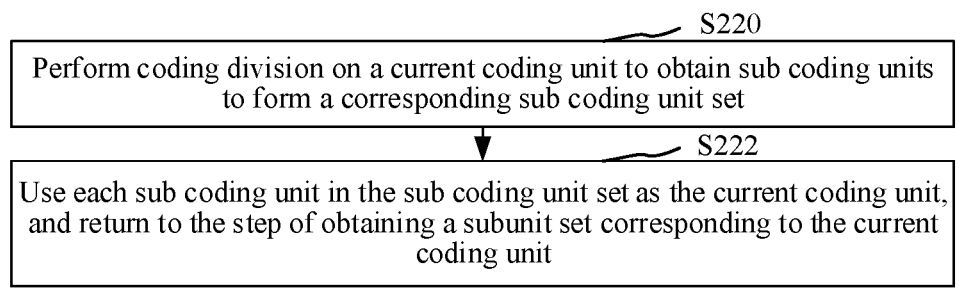
FIG. 9 is a schematic flowchart of a video encoding method in still another embodiment.

As shown in FIG. 9, in an embodiment, the video encoding method further includes the following steps.

In step S220, coding division is performed on the current coding unit to obtain sub coding units to form a corresponding sub coding unit set.

In an embodiment, one coding unit is divided to obtain smaller coding units through coding division. A mode and the number of times of the coding division may be defined according to different coding standards.

Figure 10:
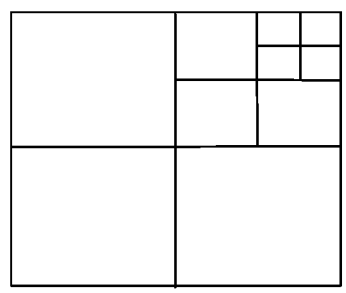
FIG. 10 is a schematic diagram of coding division in an embodiment.

As shown in FIG. 10, the HEVC is used as an example. A maximum coding unit is 64×64 pixels. Coding division is performed on the maximum coding unit to obtain four sub coding units of 32×32 pixels, coding division is performed on the four sub coding units of 32×32 pixels to obtain 16 sub coding units of 16×16 pixels, and coding division is performed on the 16 sub coding units of 16×16 pixels to obtain 64 sub coding units of 8×8 pixels.

In step S222, each sub coding unit in the sub coding unit set is used as the current coding unit, and the method returns to the step of obtaining the subunit set corresponding to the current coding unit.

In an embodiment, each sub coding unit in the sub coding unit set is used as the current coding unit, and step S202 is performed to determine the skip status of the intra-frame prediction mode corresponding to each sub coding unit. In a case that the skip status of the intra-frame prediction mode corresponding to the sub coding unit is yes, the intra-frame prediction mode is skipped for the sub coding unit, and the sub coding unit is encoded according to the intra-frame prediction mode, so that the sub coding units are encoded quickly.

Figure 11:
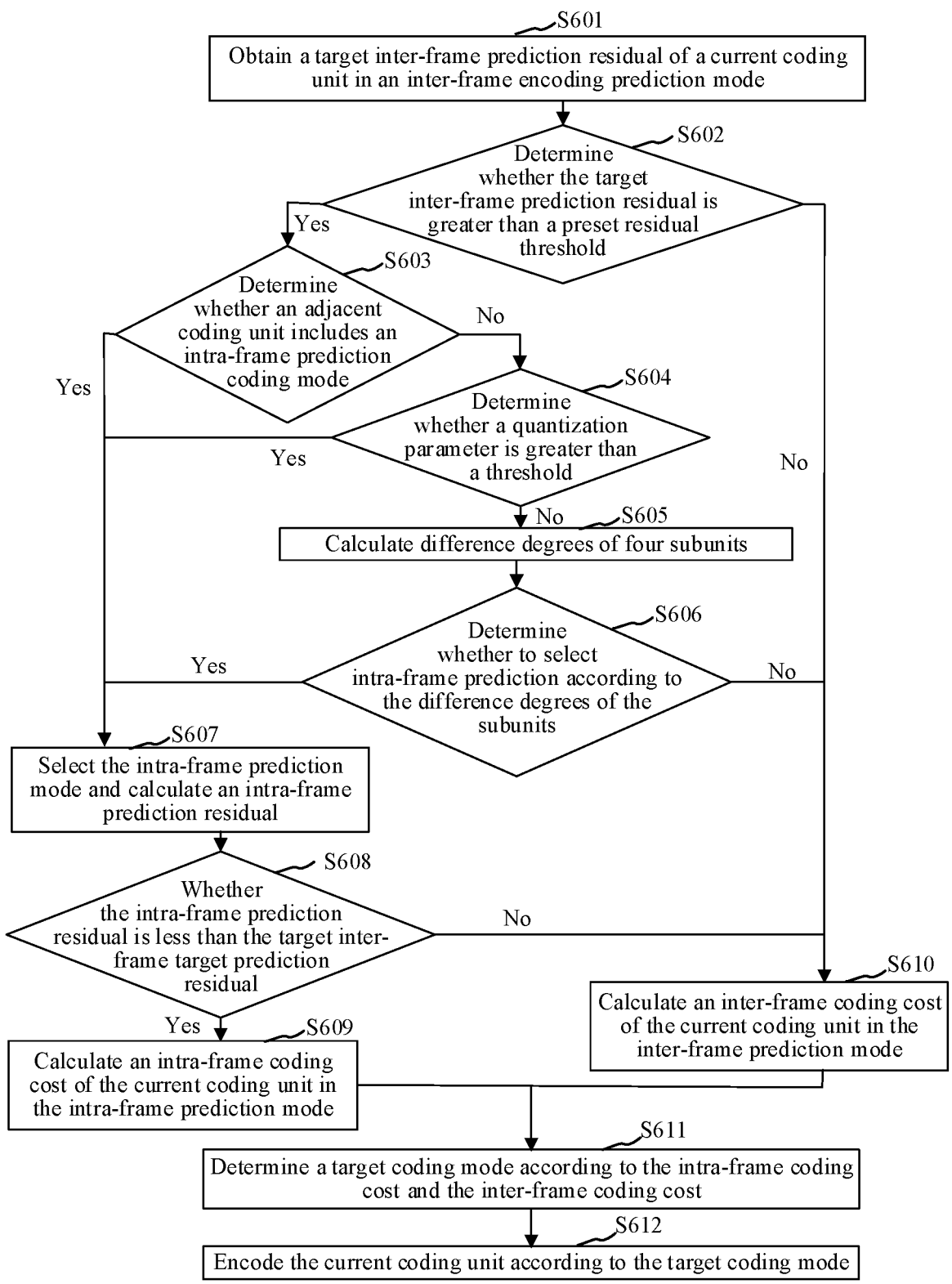
FIG. 11 is a schematic flowchart of a video encoding method in an embodiment.

As shown in FIG. 11, in a specific embodiment, a video encoding method includes the following steps.

In step S601, a target inter-frame prediction residual of a current coding unit in an inter-frame coding prediction mode is obtained. First, inter-frame prediction coding is performed on the current coding unit. An optimal inter-frame prediction mode is selected according to prediction residuals. A prediction residual corresponding to the optimal inter-frame prediction mode is the target inter-frame prediction residual.

In step S602, a determination is made as to whether the target prediction residual is greater than a preset residual threshold. Whether an intra-frame prediction mode needs to be selected is determined according to the target inter-frame prediction residual. If the target inter-frame prediction residual is not greater than the preset residual threshold, it is unnecessary to select the intra-frame prediction mode, and step S610 is directly performed. Otherwise, if the target inter-frame prediction residual is greater than the preset residual threshold, step S603 is performed.

In step S603, if encoded adjacent coding units of the current coding unit include an intra-frame prediction coding unit, it is necessary to select an intra-frame prediction mode for the current coding unit, and step S607 is performed. Otherwise, step S604 is performed.

In step S604, a determination is made as to whether a quantization parameter of the current coding unit is greater than a preset quantization parameter threshold. In a case that the quantization parameter is greater than the preset quantization parameter threshold, step S605 is performed. In a case that the quantization parameter is less than the preset quantization parameter threshold, step S607 is performed.

In step S605, difference degrees of corresponding four subunits that are obtained by performing preset division on the current coding unit are calculated.

Figure 12:
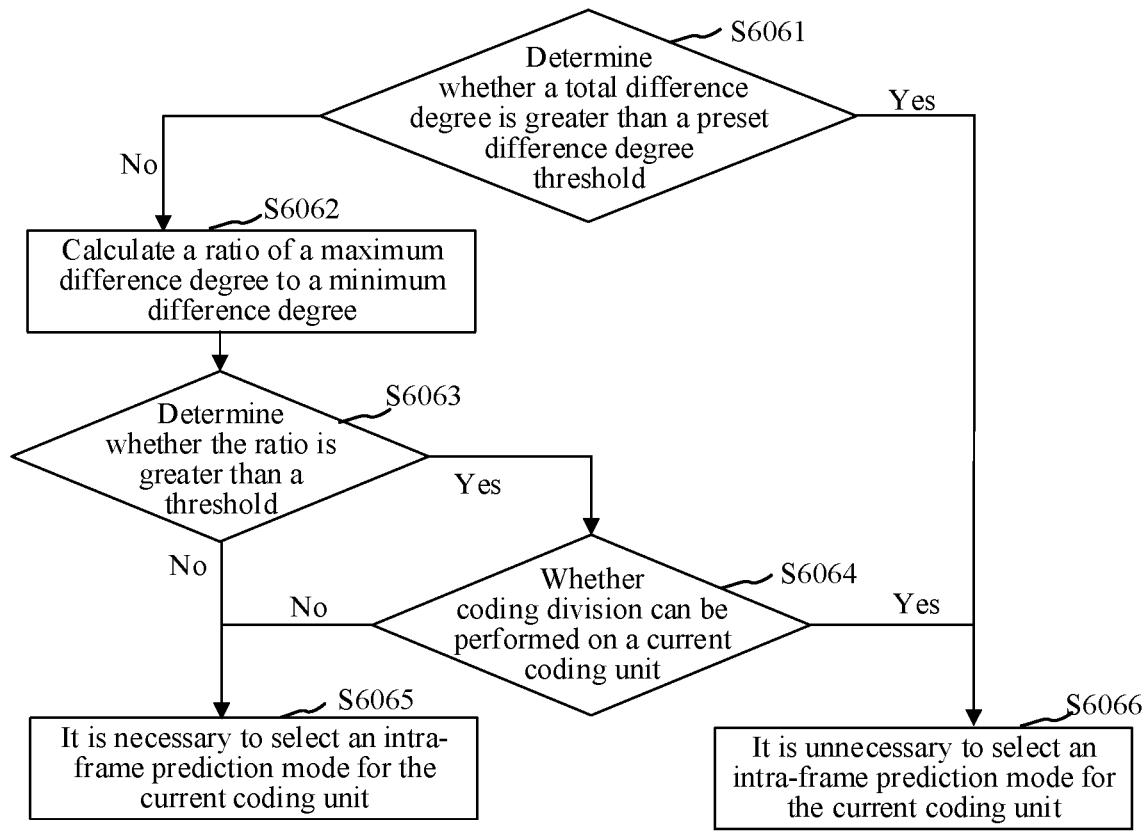
FIG. 12 is a schematic flowchart of a step of calculating a degree of difference between adjacent subunits in an embodiment.

In step S606, a determination is made as to whether to select the intra-frame prediction mode according to the difference degrees of the four subunits. If the difference degrees are small, the intra-frame prediction mode is selected, and step S607 is performed. If the difference degrees are large, step S610 is performed. As shown in FIG. 12, the specific determining step includes the following steps:

In step S6061, a determination is made as to whether a total difference degree is greater than a preset difference degree threshold. The total difference degree is obtained by obtaining four degrees of difference between every two adjacent units among the four subunits and collecting statistics on the four difference degrees. If the total difference degree is greater than the preset difference degree threshold, step S6066 is performed. Otherwise, if the total difference degree is less than or equal to the preset difference degree threshold, step S6062 is performed.

In step S6062, a ratio of a maximum difference degree to a minimum difference degree of the four sub adjacent units is calculated.

In step S6063, a determination is made as to whether the ratio obtained in step S6062 is greater than a preset threshold. If the ratio is greater than the preset threshold, step S6064 is performed. Otherwise, step S6065 is performed.

In step S6064, a determination is made as whether next-layer coding division can be performed on the current coding unit. If the next-layer coding division can be performed on the current coding unit, step S6066 is performed. Otherwise, step S6065 is performed.

In step S6065, the intra-frame prediction mode needs to be selected for the current coding unit, and step S607 is performed.

In step S6066, it is unnecessary to select the intra-frame prediction mode for the current coding unit, and step S610 is performed.

In step S607, the intra-frame prediction mode is selected and an intra-frame prediction residual is calculated. The intra-frame prediction mode is selected for the current coding unit, and a minimum prediction residual is selected from a plurality of coding modes as the intra-frame prediction residual.

In step S608, a determination is made as to whether the intra-frame prediction residual is less than the target inter-frame prediction residual. If the intra-frame prediction residual is less than the target inter-frame prediction residual, step S609 is performed. Otherwise, step S610 is performed.

In step S609, an intra-frame coding cost of the current coding unit in the intra-frame prediction mode is calculated.

In step S610, an inter-frame coding cost of the current coding unit in the intra-frame prediction mode is calculated.

In step S611, a target coding mode is determined according to the intra-frame coding cost and the inter-frame coding cost. The target coding mode is a coding mode corresponding to a minimum coding cost in the intra-frame coding cost and the inter-frame coding cost.

In step S612, the current coding unit is encoded according to the target coding mode.

Figure 13:
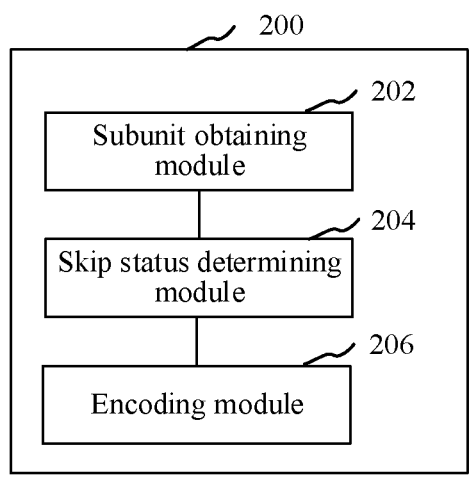
FIG. 13 is a structural block diagram of a video encoding apparatus in an embodiment.

As shown in FIG. 13, in an embodiment, a video encoding apparatus is provided, including a subunit obtaining module 202, a skip status determining module 204 and an encoding module 206.

The subunit obtaining module 202 is configured to obtain a subunit set corresponding to a current coding unit, the subunit set including subunits that are obtained by performing preset division on the current coding unit.

The skip status determining module 204 is configured to determine, according to degrees of difference between subunits in the subunit set, a skip status of an intra-frame prediction mode corresponding to the current coding unit.

The encoding module 206 is configured to skip execution of the intra-frame prediction mode for the current coding unit in a case that the skip status of the intra-frame prediction mode is yes, and encode the current coding unit according to an inter-frame prediction mode.

Figure 14:
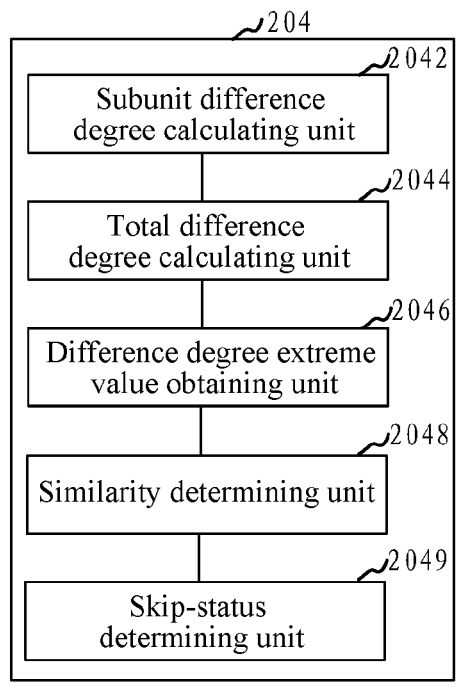
FIG. 14 is a structural block diagram of a skip status determining module in an embodiment.

As shown in FIG. 14, in an embodiment, the skip status determining module 204 includes a subunit difference degree calculating unit 2042, a total difference degree calculating unit 2044, a difference degree extreme value obtaining unit 2046, a similarity determining unit 2048 and a skip status determining unit 2049.

The subunit difference degree calculating unit 2042 is configured to calculate degrees of difference between adjacent subunits to form a difference degree set.

The total difference degree calculating unit 2044 is configured to collect statistics on the degrees of difference between adjacent subunits to obtain a total difference degree.

The difference degree extreme value obtaining unit 2046 is configured to obtain a maximum difference degree and a minimum difference degree from the difference degree set in a case that the total difference degree is less than a preset difference degree threshold.

The similarity determining unit 2048 is configured to determine, according to the maximum difference degree and the minimum difference degree, a subunit similarity corresponding to the current coding unit.

The skip status determining unit 2049 is configured to determine, according to the subunit similarity, the skip status of the intra-frame prediction mode corresponding to the current coding unit.

Figure 15:
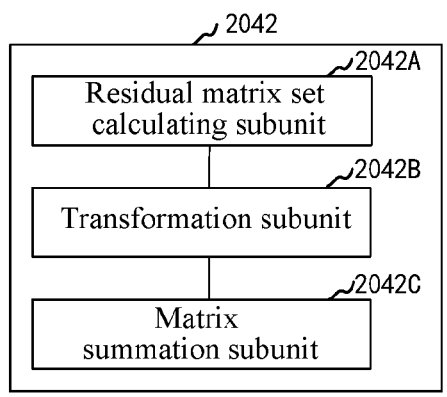
FIG. 15 is a structural block diagram of a subunit difference degree calculating unit in an embodiment.

As shown in FIG. 15, in an embodiment, the subunit difference degree calculating unit 2042 includes a residual matrix set calculating subunit 2042A, a transformation subunit S2042B and a matrix summation subunit S2042C.

The residual matrix set calculating subunit 2042A is configured to calculate pixel residuals between the adjacent subunits to obtain corresponding pixel residual matrices to form a residual matrix set.

The transformation subunit S2042B is configured to perform feature transformation on each pixel residual matrix in the residual matrix set to obtain corresponding transformation matrices to form a transformation matrix set.

The matrix summation subunit S2042C is configured to sum absolute values of matrix elements of each transformation matrix in the transformation matrix set to obtain corresponding statistical difference degrees to form the difference degree set.

In an embodiment, the skip status determining unit 2049 is further configured to determine the skip status of the intra-frame prediction mode corresponding to the current coding unit to be yes in a case that the total difference degree is greater than the preset difference degree threshold.

In an embodiment, the similarity determining unit 2048 is further configured to calculate a ratio of the maximum difference degree to the minimum difference degree.

The skip status determining unit 2049 is further configured to determine the skip status of the intra-frame prediction mode corresponding to the current coding unit to be no in a case that the ratio is less than a preset threshold.

In an embodiment, the skip status determining unit 2049 is further configured to determine the skip status of the intra-frame prediction mode corresponding to the current coding unit to be yes in a case that the ratio is greater than the preset threshold and coding division is allowed to be performed on the current coding unit.

In an embodiment, the skip status determining unit 2049 is further configured to determine the skip status of the intra-frame prediction mode corresponding to the current coding unit to be no in a case that the ratio is greater than the preset threshold and coding division Is not allowed to be performed on the current coding unit.

Figure 16:
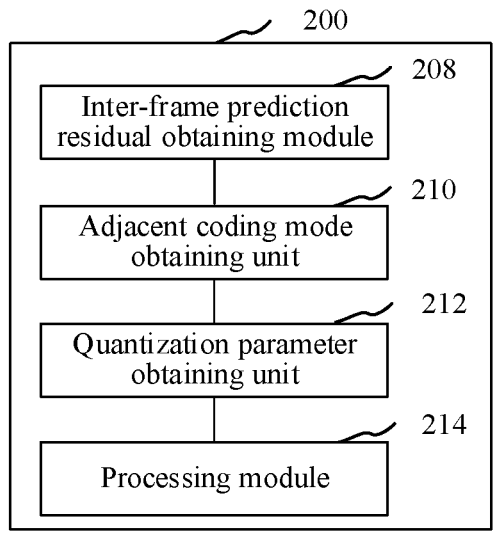
FIG. 16 is a structural block diagram of a video encoding apparatus in another embodiment.

As shown in FIG. 16, in an embodiment, a video encoding apparatus 200 includes an inter-frame prediction residual obtaining module 208, an adjacent coding mode obtaining unit 210, a quantization parameter obtaining unit 212, and a processing module 214.

The inter-frame prediction residual obtaining module 208 is configured to obtain a target inter-frame prediction residual of the current coding unit in the inter-frame prediction mode.

The adjacent coding mode obtaining unit 210 is configured to obtain a coding mode of an adjacent coding unit of the current coding unit upon detecting that the target inter-frame prediction residual is greater than a preset residual threshold.

The quantization parameter obtaining unit 212 is configured to obtain a quantization parameter of the current coding unit in a case that the coding mode of the adjacent coding unit is an inter-frame coding mode.

The processing module 214 is configured to enter the subunit obtaining module 202 in a case that the quantization parameter of the current coding unit is less than or equal to a preset quantization parameter threshold.

In an embodiment, the skip status determining module 204 is further configured to determine the skip status of the intra-frame prediction mode corresponding to the current coding unit to be no in a case that the coding mode of the adjacent coding unit is an intra-frame coding mode.

In an embodiment, the skip status determining module 204 is further configured to determine the skip status of the intra-frame prediction mode corresponding to the current coding unit to be no in a case that the quantization parameter of the current coding unit is greater than the preset quantization parameter threshold.

Figure 17:
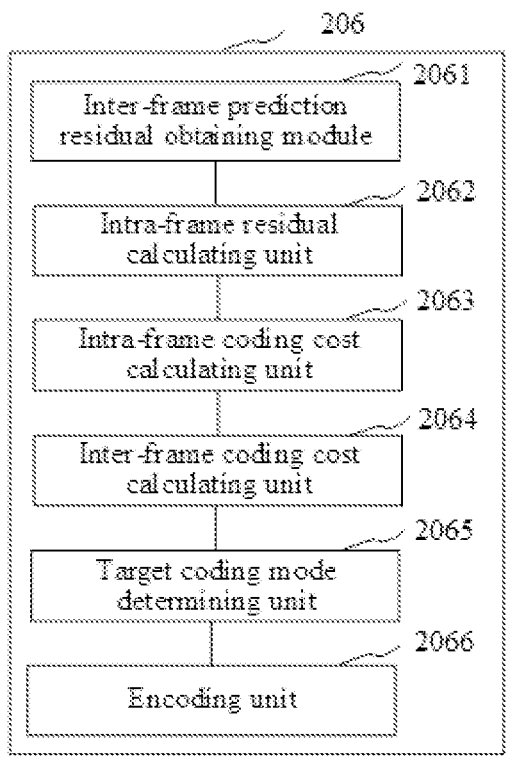
FIG. 17 is a structural block diagram of an encoding module in another embodiment.

As shown in FIG. 17, in an embodiment, the encoding module 206 includes an inter-frame prediction residual obtaining unit 2061, an intra-frame residual calculating unit 2062, an intra-frame coding cost calculating unit 2063, an inter-frame coding cost calculating unit 2064, a target coding mode determining unit 2065 and an encoding unit 2066.

The inter-frame prediction residual obtaining unit 2061 is configured to obtain a target inter-frame prediction residual of the current coding unit in the inter-frame prediction mode.

The intra-frame residual calculating unit 2062 is configured to calculate a target intra-frame prediction residual of the current coding unit in the intra-frame prediction mode in a case that the skip status of the intra-frame prediction mode is no.

The intra-frame coding cost calculating unit 2063 is configured to calculate an intra-frame coding cost of the current coding unit according to the target intra-frame prediction residual in a case that the target intra-frame prediction residual is less than the target inter-prediction residual.

The inter-frame coding cost calculating unit 2064 is configured to calculate an inter-frame coding cost corresponding to the current coding unit according to the target inter-frame prediction residual in a case that the intra-frame prediction residual is greater than the target inter-frame prediction residual.

The target coding mode determining unit 2065 is configured to determine a target coding mode according to the intra-frame coding cost and the inter-frame coding cost.

The encoding unit 2066 is configured to encode the current coding unit according to the target coding mode.

Figure 18:
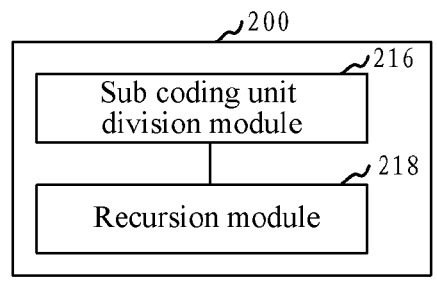
FIG. 18 is a structural block diagram of a video encoding apparatus in an embodiment.

As shown in FIG. 18, in an embodiment, the video encoding apparatus 200 further includes a sub coding unit division module 216 and a recursion module 218.

The sub coding unit division module 216 is configured to perform coding division on the current coding unit to obtain sub coding units to form a corresponding sub coding unit set.

The recursion module 218 is configured to use each sub coding unit in the sub coding unit set as the current coding unit, and return to the subunit obtaining module 202.

In an embodiment, a computer device is further provided. An internal structure of the computer device may be shown in FIG. 19. The computer device includes a video encoding apparatus, the video encoding apparatus includes modules, and each module may be wholly or partially implemented by software, hardware, or combination thereof.

Figure 19:
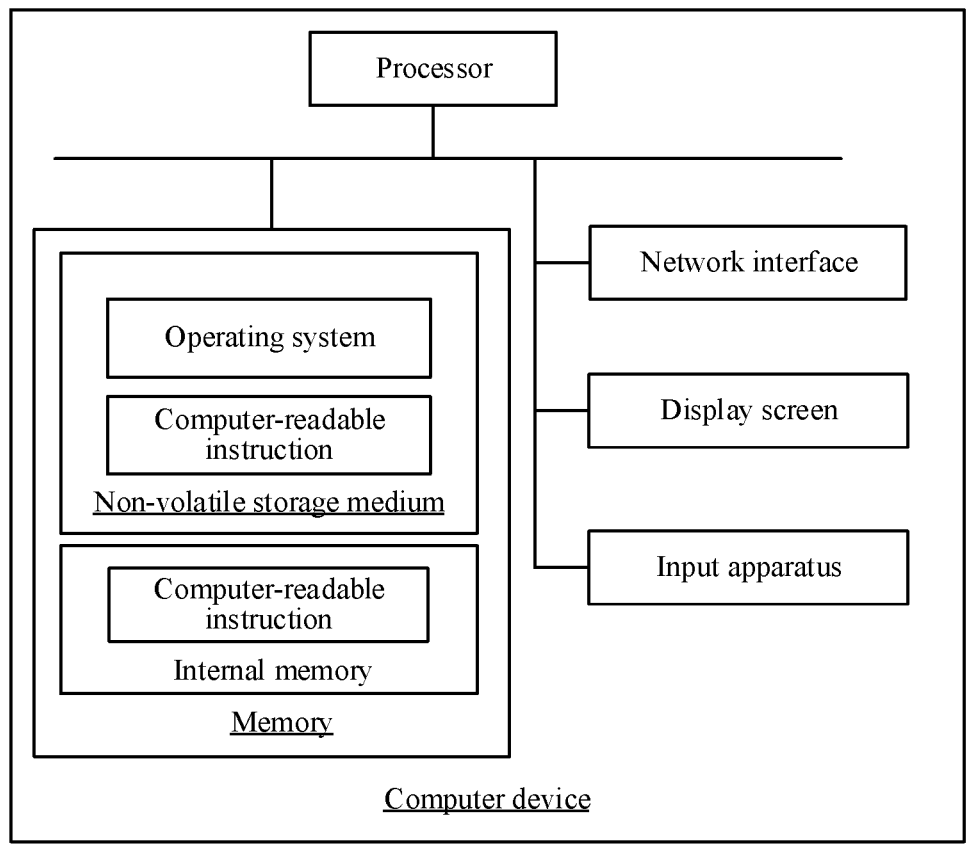
FIG. 19 is a structural block diagram of a computer device in an embodiment.

FIG. 19 is a diagram of an internal structure of a computer device in an embodiment. The computer device includes a processor (e.g., processing circuitry), a memory, a network interface, an input apparatus and a display screen that are connected by using a system bus. The memory includes a non-volatile storage medium and an internal memory. The non-volatile storage medium of the computer device stores an operating system, and may further store computer-readable instructions. The computer-readable instructions, when executed by the processor, may cause the processor to implement a video encoding method. The internal memory may also store the computer-readable instructions. The computer-readable instructions, when executed by the processor, may cause the processor to implement the video encoding method. The display screen of the computer device may be a liquid crystal display screen or an electronic ink display screen. The input apparatus of the computer device may be a touch layer covering the display screen, or may be a key, a trackball or a touchpad disposed on a housing of the computer device, and may further be an external keyboard, touchpad, mouse, or the like.

A person skilled in the art may understand that, the structure shown in FIG. 19 is only a block diagram of a partial structure related to the solution of this application, and does not constitute a limitation to the computer device to which the solution of this application is applied. Specifically, the computer device may include more or fewer components than those shown in the figure, or some components may be combined, or a different component deployment may be used.

In an embodiment, the video encoding apparatus provided in this application may be implemented in a form of computer-readable instructions, for example stored on a non-transitory computer-readable medium, and the computer-readable instructions may run on the computer device shown in FIG. 19. The memory of the computer device may store readable instruction modules forming the video encoding apparatus, for example, the subunit obtaining module, the skip status determining module, and the encoding module shown in FIG. 13. The computer-readable instructions formed by the readable instruction modules cause the processor to perform the steps of the video encoding method described in the embodiments of this application in this specification.

In an embodiment, one or more non-volatile storage media or non-transitory computer-readable media storing computer-readable instructions are provided, the computer-readable instructions, when executed by one or more processors, causing the one or more processors to perform the following steps: obtaining a subunit set corresponding to a current coding unit, the subunit set including subunits that are obtained by performing preset division on the current coding unit; determining, according to degrees of difference between subunits in the subunit set, a skip status of an intra-frame prediction mode corresponding to the current coding unit; and skipping execution of the intra-frame prediction mode for the current coding unit in a case that the skip status of the intra-frame prediction mode is yes, and encoding the current coding unit according to an inter-frame prediction mode.

In an embodiment, the determining, according to the degrees of difference between subunits in the subunit set, a skip status of an intra-frame prediction mode corresponding to the current coding unit includes: calculating degrees of difference between adjacent subunits to form a difference degree set; collecting statistics on the degrees of difference between adjacent subunits to obtain a total difference degree; obtaining a maximum difference degree and a minimum difference degree from the difference degree set in a case that the total difference degree is less than a preset difference degree threshold; determining, according to the maximum difference degree and the minimum difference degree, a subunit similarity corresponding to the current coding unit; and determining, according to the subunit similarity, the skip status of the intra-frame prediction mode corresponding to the current coding unit.

In an embodiment, the calculating degrees of difference between adjacent subunits to form a difference degree set includes: calculating pixel residuals between the adjacent subunits to obtain corresponding pixel residual matrices to form a residual matrix set; performing feature transformation on each pixel residual matrix in the residual matrix set to obtain corresponding transformation matrices to form a transformation matrix set; and summing absolute values of matrix elements of each transformation matrix in the transformation matrix set to obtain corresponding statistical difference degrees to form the difference degree set.

In an embodiment, after the step of collecting statistics on the degrees of difference between adjacent subunits to obtain a total difference degree, the computer-readable instructions further cause the processor to perform the following step: determining the skip status of the intra-frame prediction mode corresponding to the current coding unit to be yes in a case that the total difference degree is greater than the preset difference degree threshold.

In an embodiment, the determining, according to the maximum difference degree and the minimum difference degree, a subunit similarity corresponding to the current coding unit, and determining, according to the subunit similarity, the skip status of the intra-frame prediction mode corresponding to the current coding unit includes: calculating a ratio of the maximum difference degree to the minimum difference degree; and determining the skip status of the intra-frame prediction mode corresponding to the current coding unit to be no in a case that the ratio is less than a preset threshold.

In an embodiment, after the calculating a ratio of the maximum difference degree to the minimum difference degree, the computer-readable instructions further cause the processor to perform the following step: determining the skip status of the intra-frame prediction mode corresponding to the current coding unit to be yes in a case that the ratio is greater than the preset threshold and coding division is allowed to be performed on the current coding unit.

In an embodiment, after the calculating a ratio of the maximum difference degree to the minimum difference degree, the computer-readable instructions further cause the processor to perform the following step: determining the skip status of the intra-frame prediction mode corresponding to the current coding unit to be no in a case that the ratio is greater than the preset threshold and coding division is not allowed to be performed on the current coding unit.

In an embodiment, before the obtaining a subunit set corresponding to a current coding unit, the subunit set including subunits that are obtained by performing preset division on the current coding unit, the computer-readable instructions further cause the processor to perform the following steps: obtaining a target inter-frame prediction residual of the current coding unit in the inter-frame prediction mode; obtaining a coding mode of an adjacent coding unit of the current coding unit upon detecting that the target inter-frame prediction residual is greater than a preset residual threshold; obtaining a quantization parameter of the current coding unit in a case that the coding mode of the adjacent coding unit is an inter-frame coding mode; and performing the step of obtaining the subunit set corresponding to the current coding unit in a case that the quantization parameter of the current coding unit is less than or equal to a preset quantization parameter threshold.

In an embodiment, after the obtaining a coding mode of an adjacent coding unit of the current coding unit, the computer-readable instructions further cause the processor to perform the following step: determining the skip status of the intra-frame prediction mode corresponding to the current coding unit to be no in a case that the coding mode of the adjacent coding unit is an intra-frame coding mode.

In an embodiment, after the obtaining a quantization parameter of the current coding unit, the computer-readable instructions further cause the processor to perform the following step: determining the skip status of the intra-frame prediction mode corresponding to the current coding unit to be no in a case that the quantization parameter of the current coding unit is greater than the preset quantization parameter threshold.

In an embodiment, the computer-readable instructions further cause the processor to perform the following steps: obtaining a target inter-frame prediction residual of the current coding unit in the inter-frame prediction mode; calculating a target intra-frame prediction residual of the current coding unit in the intra-frame prediction mode in a case that the skip status of the intra-frame prediction mode is no; calculating an intra-frame coding cost of the current coding unit according to the target intra-frame prediction residual in a case that the target intra-frame prediction residual is less than the target inter-prediction residual; calculating an inter-frame coding cost corresponding to the current coding unit according to the target inter-frame prediction residual in a case that the intra-frame prediction residual is greater than the target inter-frame prediction residual; determining a target coding mode according to the intra-frame coding cost and the inter-frame coding cost; and encoding the current coding unit according to the target coding mode.

In an embodiment, the computer-readable instructions further cause the processor to perform the following steps: performing coding division on the current coding unit to obtain sub coding units to form a corresponding sub coding unit set; and using each sub coding unit in the sub coding unit set as the current coding unit, and returning to the step of obtaining the subunit set corresponding to the current coding unit.

In an embodiment, a computer device is provided, including a memory and a processor, the memory storing computer-readable instructions, and the computer-readable instructions, when executed by the processor, causing the processor to perform the following steps: obtaining a subunit set corresponding to a current coding unit, the subunit set including subunits that are obtained by performing preset division on the current coding unit; determining, according to degrees of difference between subunits in the subunit set, a skip status of an intra-frame prediction mode corresponding to the current coding unit; and skipping execution of the intra-frame prediction mode for the current coding unit in a case that the skip status of the intra-frame prediction mode is yes, and encoding the current coding unit according to an inter-frame prediction mode.

In an embodiment, the determining, according to the degrees of difference between subunits in the subunit set, a skip status of an intra-frame prediction mode corresponding to the current coding unit includes: calculating degrees of difference between adjacent subunits to form a difference degree set; collecting statistics on the degrees of difference between adjacent subunits to obtain a total difference degree; obtaining a maximum difference degree and a minimum difference degree from the difference degree set in a case that the total difference degree is less than a preset difference degree threshold; determining, according to the maximum difference degree and the minimum difference degree, a subunit similarity corresponding to the current coding unit; and determining, according to the subunit similarity, the skip status of the intra-frame prediction mode corresponding to the current coding unit.

In an embodiment, the calculating degrees of difference between adjacent subunits to form a difference degree set includes: calculating pixel residuals between the adjacent subunits to obtain corresponding pixel residual matrices to form a residual matrix set; performing feature transformation on each pixel residual matrix in the residual matrix set to obtain corresponding transformation matrices to form a transformation matrix set; and summing absolute values of matrix elements of each transformation matrix in the transformation matrix set to obtain corresponding statistical difference degrees to form the difference degree set.

In an embodiment, after the collecting statistics on the degrees of difference between adjacent subunits to obtain a total difference degree, the processor performs the following step by executing the computer-readable instructions: determining the skip status of the intra-frame prediction mode corresponding to the current coding unit to be yes in a case that the total difference degree is greater than the preset difference degree threshold.

In an embodiment, the determining, according to the maximum difference degree and the minimum difference degree, a subunit similarity corresponding to the current coding unit, and determining, according to the subunit similarity, the skip status of the intra-frame prediction mode corresponding to the current coding unit includes: calculating a ratio of the maximum difference degree to the minimum difference degree; and determining the skip status of the intra-frame prediction mode corresponding to the current coding unit to be no in a case that the ratio is less than a preset threshold.

In an embodiment, after the calculating a ratio of the maximum difference degree to the minimum difference degree, the processor performs the following step by executing the computer-readable instructions: determining the skip status of the intra-frame prediction mode corresponding to the current coding unit to be yes in a case that the ratio is greater than the preset threshold and coding division is allowed to be performed on the current coding unit.

In an embodiment, after the calculating a ratio of the maximum difference degree to the minimum difference degree, the processor performs the following step by executing the computer-readable instructions: determining the skip status of the intra-frame prediction mode corresponding to the current coding unit to be no in a case that the ratio is greater than the preset threshold and coding division is not allowed to be performed on the current coding unit.

In an embodiment, before the obtaining a subunit set corresponding to a current coding unit, the subunit set including subunits that are obtained by performing preset division on the current coding unit, the processor performs the following steps by executing the computer-readable instructions: obtaining a target inter-frame prediction residual of the current coding unit in the inter-frame prediction mode; obtaining a coding mode of an adjacent coding unit of the current coding unit upon detecting that the target inter-frame prediction residual is greater than a preset residual threshold; obtaining a quantization parameter of the current coding unit in a case that the coding mode of the adjacent coding unit is an inter-frame coding mode; and performing the step of obtaining the subunit set corresponding to the current coding unit in a case that the quantization parameter of the current coding unit is less than or equal to a preset quantization parameter threshold.

In an embodiment, after the obtaining a coding mode of an adjacent coding unit of the current coding unit, the processor performs the following step by executing the computer-readable instructions: determining the skip status of the intra-frame prediction mode corresponding to the current coding unit to be no in a case that the coding mode of the adjacent coding unit is an intra-frame coding mode.

In an embodiment, after the obtaining a quantization parameter of the current coding unit, the processor performs the following step by executing the computer-readable instructions: determining the skip status of the intra-frame prediction mode corresponding to the current coding unit to be no in a case that the quantization parameter of the current coding unit is greater than the preset quantization parameter threshold.

In an embodiment, the processor performs the following steps by executing the computer-readable instructions: obtaining a target inter-frame prediction residual of the current coding unit in the inter-frame prediction mode; calculating a target intra-frame prediction residual of the current coding unit in the intra-frame prediction mode in a case that the skip status of the intra-frame prediction mode is no; calculating an intra-frame coding cost of the current coding unit according to the target intra-frame prediction residual in a case that the target intra-frame prediction residual is less than the target inter-prediction residual; calculating an inter-frame coding cost corresponding to the current coding unit according to the target inter-frame prediction residual in a case that the intra-frame prediction residual is greater than the target inter-frame prediction residual; determining a target coding mode according to the intra-frame coding cost and the inter-frame coding cost; and encoding the current coding unit according to the target coding mode.

In an embodiment, the processor performs the following steps by executing the computer-readable instructions: performing coding division on the current coding unit to obtain sub coding units to form a corresponding sub coding unit set; and using each sub coding unit in the sub coding unit set as the current coding unit, and returning to the step of obtaining the subunit set corresponding to the current coding unit.

It is to be understood that the steps in the embodiments of this application are not necessarily performed in a sequence indicated by the step numbers. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the other step.

A person of ordinary skill in the art may understand that some or all procedures in the method in the foregoing embodiments may be implemented by a computer-readable instruction instructing related hardware. The readable instruction may be stored in a non-volatile computer-readable storage medium, and when the readable instruction is executed, the procedures in the foregoing method embodiments may be implemented. Any reference to a memory, a storage, a database, or another medium (e.g., non-transitory computer-readable medium) used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be combined in various manners. For concise description, not all possible combinations of the technical features in the embodiments are described. However, as long as combinations of the technical features do not conflict with each other, the combinations of the technical features are considered as falling within the scope described in this specification.

The foregoing embodiments only show several implementations of this application, and descriptions thereof are in detail, but shall not be understood as a limitation to the patent scope of this application. A person of ordinary skill in the art may further make variations and improvements without departing from the ideas of this application, and the variations and improvements shall fall within the protection scope of this application.

What is claimed is:

1. A video encoding method, comprising:
   obtaining, by processing circuitry, a plurality of subunits by performing preset division on a current coding unit;
   determining, by the processing circuitry, a skip status of an intra-frame prediction mode corresponding to the current coding unit according to differences between the plurality of subunits of the current coding unit, the skip status indicating whether the intra-frame prediction mode is skipped for the current coding unit; and
   in a case that the skip status of the intra-frame prediction mode corresponding to the current coding unit is determined to be skipped according to the differences between the plurality of subunits,
   skipping, by the processing circuitry, execution of the intra-frame prediction mode for the current coding unit, and encoding the current coding unit according to an inter-frame prediction mode.

2. The method according to claim 1, wherein the determining comprises:
   calculating, by the processing circuitry, the differences between adjacent subunits of the plurality of subunits to form a difference set;
   collecting, by the processing circuitry, statistics on the differences between the adjacent subunits to obtain a total difference;
   obtaining, by the processing circuitry, a maximum difference and a minimum difference from the difference set in a case that the total difference is less than a preset difference threshold;
   determining, by the processing circuitry, a subunit similarity of the current coding unit according to the maximum difference and the minimum difference; and
   determining, by the processing circuitry, the skip status of the intra-frame prediction mode corresponding to the current coding unit according to the subunit similarity.

3. The method according to claim 2, wherein the calculating comprises:
   calculating, by the processing circuitry, pixel residuals between the adjacent subunits to obtain corresponding pixel residual matrices to form a residual matrix set;
   performing, by the processing circuitry, feature transformation on each of the pixel residual matrices in the residual matrix set to obtain corresponding transformation matrices to form a transformation matrix set; and
   summing, by the processing circuitry, absolute values of matrix elements of each of the transformation matrices in the transformation matrix set to obtain corresponding statistical differences to form the difference set.

4. The method according to claim 2, wherein after the collecting, the method comprises:
  determining the skip status of the intra-frame prediction mode corresponding to the current coding unit to be skipped in a case that the total difference is greater than the preset difference threshold.

5. The method according to claim 2, wherein
  the determining the subunit similarity includes calculating a ratio of the maximum difference to the minimum difference; and
  the determining the skip status includes determining the skip status of the intra-frame prediction mode corresponding to the current coding unit to be not skipped in a case that the ratio is less than a preset threshold.

6. The method according to claim 5, wherein the determining the skip status further comprises:
  determining the skip status of the intra-frame prediction mode corresponding to the current coding unit to be skipped in a case that the ratio is greater than the preset threshold and coding division is allowed to be performed on the current coding unit.

7. The method according to claim 5, wherein the determining the skip status further comprises:
  determining the skip status of the intra-frame prediction mode corresponding to the current coding unit to be not skipped in a case that the ratio is greater than the preset threshold and coding division is not allowed to be performed on the current coding unit.

8. The method according to claim 1, further comprising:
  obtaining, by the processing circuitry, a target inter-frame prediction residual of the current coding unit in the inter-frame prediction mode;
  obtaining, by the processing circuitry, a coding mode of an adjacent coding unit of the current coding unit based on detecting that the target inter-frame prediction residual is greater than a preset residual threshold; and
  obtaining, by the processing circuitry, a quantization parameter of the current coding unit in a case that the coding mode of the adjacent coding unit is an inter-frame coding mode, wherein
  the obtaining the plurality of subunits includes obtaining the plurality of subunits in a case that the quantization parameter of the current coding unit is less than or equal to a preset quantization parameter threshold.

9. The method according to claim 8, wherein after the obtaining the coding mode of the adjacent coding unit of the current coding unit, the method further comprises:
  determining the skip status of the intra-frame prediction mode corresponding to the current coding unit to be not skipped in a case that the coding mode of the adjacent coding unit is an intra-frame coding mode.

10. The method according to claim 8, wherein after the obtaining the quantization parameter of the current coding unit, the method comprises:
  determining the skip status of the intra-frame prediction mode corresponding to the current coding unit to be not skipped in a case that the quantization parameter of the current coding unit is greater than the preset quantization parameter threshold.

11. The method according to claim 1, further comprising:
  obtaining, by the processing circuitry, a target inter-frame prediction residual of the current coding unit in the inter-frame prediction mode;
  calculating, by the processing circuitry, a target intra-frame prediction residual of the current coding unit in the intra-frame prediction mode in a case that the skip status of the intra-frame prediction mode is not skipped;
  calculating, by the processing circuitry, an intra-frame coding cost of the current coding unit according to the target intra-frame prediction residual in a case that the target intra-frame prediction residual is less than the target inter-prediction residual;
  calculating, by the processing circuitry, an inter-frame coding cost corresponding to the current coding unit according to the target inter-frame prediction residual in a case that the intra-frame prediction residual is greater than the target inter-frame prediction residual;
  determining, by the processing circuitry, a target coding mode according to the intra-frame coding cost and the inter-frame coding cost; and
  encoding, by the processing circuitry, the current coding unit according to the target coding mode.

12. The method according to claim 1, further comprising:
  performing, by the processing circuitry, coding division on the current coding unit to obtain a plurality of sub coding units, wherein
  the current coding unit is one of the plurality of sub coding units.

13. A video encoding apparatus, comprising:
  processing circuitry configured to:
    obtain a plurality of subunits by performing preset division on a current coding unit;
    determine a skip status of an intra-frame prediction mode corresponding to the current coding unit according to differences between the plurality of subunits of the current coding unit, the skip status indicating whether the intra-frame prediction mode is skipped for the current coding unit; and
    in a case that the skip status of the intra-frame prediction mode corresponding to the current coding unit is determined to be skipped according to the differences between the plurality of subunits,
    skip execution of the intra-frame prediction mode for the current coding unit, and encode the current coding unit according to an inter-frame prediction mode.

14. The video encoding apparatus according to claim 13, wherein the processing circuitry is configured to:
  calculate the differences between adjacent subunits of the plurality of subunits to form a difference set;
  collect statistics on the differences between the adjacent subunits to obtain a total difference;
  obtain a maximum difference and a minimum difference from the difference set in a case that the total difference is less than a preset difference threshold;
  determine a subunit similarity of the current coding unit according to the maximum difference and the minimum difference; and
  determine the skip status of the intra-frame prediction mode corresponding to the current coding unit according to the subunit similarity.

15. The video encoding apparatus according to claim 14, wherein the processing circuitry is configured to:
  calculate pixel residuals between the adjacent subunits to obtain corresponding pixel residual matrices to form a residual matrix set;
  perform feature transformation on each of the pixel residual matrices in the residual matrix set to obtain corresponding transformation matrices to form a transformation matrix set; and sum absolute values of matrix elements of each of the transformation matrices in the transformation matrix set to obtain corresponding statistical differences to form the difference set.

16. The video encoding apparatus according to claim 14, wherein the processing circuitry is configured to:
determine, after the statistics are collected, the skip status of the intra-frame prediction mode corresponding to the current coding unit to be skipped in a case that the total difference is greater than the preset difference threshold.

17. The video encoding apparatus according to claim 14, wherein the processing circuitry is configured to:
calculate a ratio of the maximum difference to the minimum difference; and
determine the skip status of the intra-frame prediction mode corresponding to the current coding unit to be not skipped in a case that the ratio is less than a preset threshold.

18. The video encoding apparatus according to claim 17, wherein the processing circuitry is configured to:
determine the skip status of the intra-frame prediction mode corresponding to the current coding unit to be skipped in a case that the ratio is greater than the preset threshold and coding division is allowed to be performed on the current coding unit.

19. The video encoding apparatus according to claim 17, wherein the processing circuitry is configured to:
determine the skip status of the intra-frame prediction mode corresponding to the current coding unit to be not skipped in a case that the ratio is greater than the preset threshold and coding division is not allowed to be performed on the current coding unit.

20. A non-transitory computer-readable storage medium storing instructions which when executed by a processor cause the processor to perform:
obtaining a plurality of subunits by performing preset division on a current coding unit;
determining a skip status of an intra-frame prediction mode corresponding to the current coding unit according to differences between the plurality of subunits of the current coding unit, the skip status indicating whether the intra-frame prediction mode is skipped for the current coding unit; and
in a case that the skip status of the intra-frame prediction mode corresponding to the current coding unit is determined to be skipped according to the differences between the plurality of subunits,
skipping execution of the intra-frame prediction mode for the current coding unit, and encoding the current coding unit according to an inter-frame prediction mode.

* * * * *